(12) United States Patent
Kwitek (10) Patent No.: US 11,112,832 B2
(45) Date of Patent: *Sep. 7, 2021

(54) HAND PADS FOR TABLET TYPE COMPUTERS

(71) Applicant: Benjamin J. Kwitek, Canon City, CO (US)

(72) Inventor: Benjamin J. Kwitek, Canon City, CO (US)

(73) Assignee: GELLYFISH TECHNOLOGY OF TEXAS, L.L.C., Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,875

(22) Filed: Apr. 23, 2020

(65) Prior Publication Data

US 2020/0301478 A1 Sep. 24, 2020

Related U.S. Application Data

(63) Continuation of application No. 13/372,949, filed on Feb. 14, 2012, now Pat. No. 10,671,125, which is a continuation-in-part of application No. 12/588,375, filed on Oct. 14, 2009, now abandoned, which is a continuation-in-part of application No. 11/024,766, filed on Dec. 30, 2004, now abandoned, which is a continuation-in-part of application No. 10/458,256, filed on Jun. 11, 2003, now Pat. No. 6,963,486.

(60) Provisional application No. 60/533,259, filed on Dec. 31, 2003, provisional application No. 60/388,367, filed on Jun. 14, 2002.

(51) Int. Cl.
G06F 1/16 (2006.01)

(52) U.S. Cl.
CPC .......... *G06F 1/1656* (2013.01); *G06F 1/1616* (2013.01)

(58) Field of Classification Search
CPC ............................ G06F 1/1656; G06F 1/1616
USPC .... 361/679.19, 679.46, 679.55–679.56, 700; 206/320; 150/154–168
See application file for complete search history.

(56) References Cited

U.S. PATENT DOCUMENTS

| | | | |
|---|---|---|---|
| D352,279 S * | 11/1994 | Foy | D14/341 |
| 6,251,970 B1 * | 6/2001 | Persiani | C09K 5/063 523/204 |
| 6,466,299 B1 * | 10/2002 | Lehtiniemi | H04M 1/0283 349/199 |
| 8,124,216 B2 * | 2/2012 | Antonini | B32B 3/00 428/172 |
| 10,671,125 B2 * | 6/2020 | Kwitek | G06F 1/1656 |

* cited by examiner

*Primary Examiner* — Zachary Pape
(74) *Attorney, Agent, or Firm* — Welsh Flaxman & Gitler LLC (57) ABSTRACT

A tablet computer includes a housing and a touch screen. The housing supports a touch screen for manipulation by a user of the computer. At least one hand pad is selectively secured to the tablet housing. The at least one hand pad is positioned at the back of the tablet for supporting the hand of a user as the user manipulates the touch screen. The pad includes a bottom surface shaped and dimensioned to rest firmly upon the tablet housing and a top surface contoured to comfortably support a hand of a user. The hand pad may also include side walls designed to wrap around the edges of the tablet housing.

7 Claims, 8 Drawing Sheets

HAND PADS FOR TABLET TYPE COMPUTERS

CROSS REFERENCE TO RELATED APPLICATIONS

This application is a continuation of U.S. patent application Ser. No. 13/372,949, entitled "HAND PADS FOR TABLET TYPE COMPUTER," filed Feb. 14, 2012, which is currently pending, which is a continuation in part of U.S. patent application Ser. No. 12/588,375, filed Oct. 14, 2009, entitled "PHASE CHANGE MATERIAL HAND PADS FOR LAPTOP COMPUTERS AND OTHER ELECTRONIC DEVICES", which is abandoned, which is a continuation-in-part of U.S. patent application Ser. No. 11/024,766, filed Dec. 30, 2004, entitled "PHASE CHANGE MATERIAL HAND PADS FOR LAPTOP COMPUTERS AND OTHER ELECTRONIC DEVICES", which is abandoned, which claims the benefit of U.S. Provisional Patent Application Ser. No. 60/533,259, filed Dec. 31, 2003, entitled "HAND PADS FOR LAPTOP COMPUTERS AND OTHER ELECTRONIC DEVICES", and U.S. patent application Ser. No. 11/024,766, filed Dec. 30, 2004 is a continuation in part of U.S. patent application Ser. No. 10/458,256, filed Jun. 11, 2003, entitled "HAND PADS FOR LAPTOP COMPUTERS AND OTHER ELECTRONIC DEVICES", which is now U.S. Pat. No. 6,963,486 issued Nov. 8, 2005, which claims the benefit of U.S. Provisional Application Ser. No. 60/388,367, entitled "HAND PADS FOR LAPTOP COMPUTERS AND OTHER ELECTRONIC DEVICES", filed Jun. 14, 2002. In addition, the present application relates to U.S. Pat. No. 6,336,614, entitled "CONFORMABLE PORTABLE COMPUTER HAND PADS", which issued Jan. 8, 2002 and U.S. Pat. No. 6,963,486, entitled "HAND PADS FOR LAPTOP COMPUTERS AND OTHER ELECTRONIC DEVICES", which issued Nov. 8, 2005.

BACKGROUND OF THE INVENTION

1. Field of the Invention

This invention relates to ergonomic hand pads for tablet type computers and other electronic devices. More particularly, the invention relates to ergonomic hand pads utilizing soft or rubberized materials or coatings, finishes, surfaces and other materials to enhance user comfort and grip when employing the present hand pads.

2. Background of the Invention

The use of computer input devices such as tablets, which are also referred to herein as tablet type computers, tablet computers, etc., and other similar devices is becoming increasingly prevalent in modern computing. However, continuous use of these input devices is often uncomfortable, and sometimes hazardous to the user. For example, touch screens commonly employed with tablet type computers require positioning the user's hand in a steady and sometimes unnatural position on the tablet which can cause the muscles, tendons and bones in the hand to lie in a strained position, often resulting in discomfort.

Most current tablet computers simply have a back cover and sides produced from metal, glass or hard plastics. While effective in protecting the internal electronics, these devices provide little in terms of easy grip or comfort for the user's hands and forearms. A need, therefore, exists for a hand pad useful in conjunction with tablets. The present invention provides such a tablet hand pad.

SUMMARY OF THE INVENTION

It is, therefore, an object of the present invention to provide a tablet computer including a housing having a back side and front side with a touch screen for manipulation by a user of the tablet computer. A hand pad is secured to the housing, the hand pad being positioned the back side of the housing of the tablet computer for supporting the hand of a user as the user manipulates the touch screen. The hand pad includes a bottom surface shaped and dimensioned to rest firmly upon the back side of the housing of the tablet computer and a top surface contoured to comfortably support a hand of a user.

It is also an object of the present invention to provide a tablet computer wherein the hand pad includes a viscoelastic solid-phase material.

It is another object of the present invention to provide a tablet computer wherein the viscoelastic solid-phase material is a thermoplastic elastomer.

It is further object of the present invention to provide a tablet computer wherein the viscoelastic solid-phase material is a rubber or thermoset material.

It is also an object of the present invention to provide a tablet computer wherein the hand pad includes a coating.

It is another object of the present invention to provide a tablet computer wherein the coating is a fabric, leather or foam.

It is further object of the present invention to provide a tablet computer wherein the coating has a phase change material incorporated therein.

It is also an object of the present invention to provide a tablet computer wherein the hand pad is integrally formed with the back side of the housing.

It is another object of the present invention to provide a tablet computer wherein the hand pad is selectively secured to the back side of the housing.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1 to 18, the various embodiments of the present invention are disclosed. Since many elements are similar in the various embodiments disclosed herein, similar reference numerals have been used herein as deemed appropriate. A tablet computer 100 is disclosed. The tablet computer 100 includes a housing 102 having a back side 104 and a front side 106. The front side 106 is provided with a touch screen 108 for manipulation by a user of the tablet computer 100. The tablet computer 100 also includes at least one pad 10 selectively secured to the back side 104 of the housing 102 of the tablet 100, the at least one pad 10 being positioned at the back side 104 of the tablet computer 100 for supporting the hand of a user as the user manipulates the touch screen 108. The hand pad 10 includes a bottom surface 14 shaped and dimensioned to rest firmly upon the housing 102 of the tablet computer 100 and a top surface 16 contoured to comfortably support a hand of a user.

Figure 1:
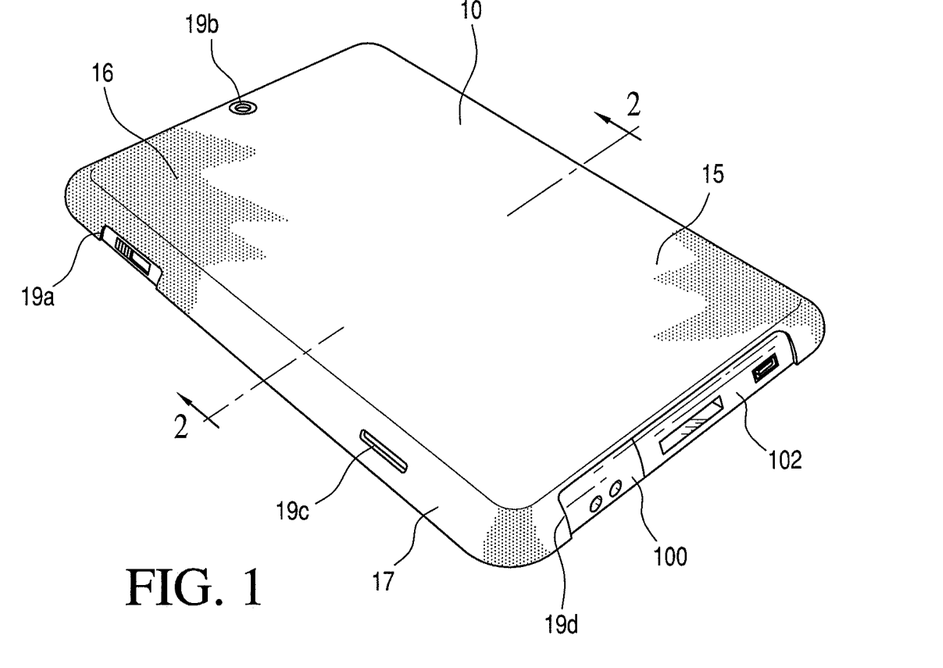
FIG. 1 is a perspective view of a tablet computer with a hand pad in accordance with the present invention.
Figure 2:
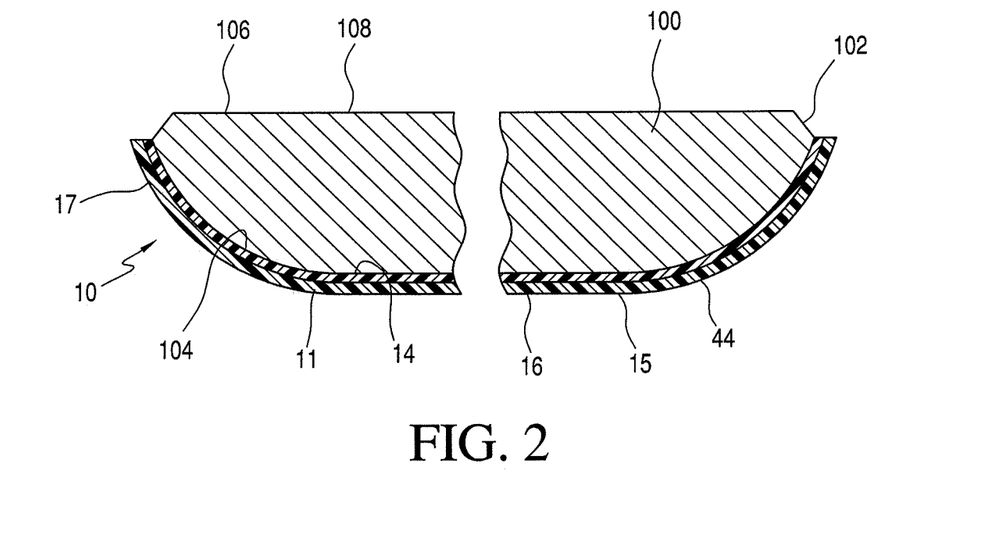
FIG. 2 is a cross sectional view of the tablet computer and hand pad shown in FIG. 1 along the line 2-2.
Figure 3:
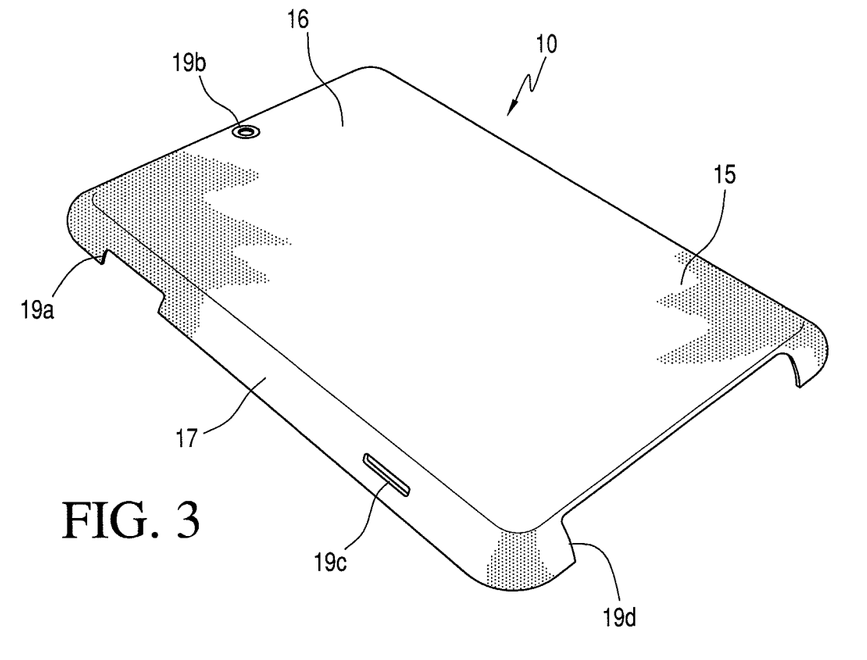
FIGS. 3 and 4 respectively are a top perspective view and a bottom perspective view of the hand pad shown in FIG. 1.
Figure 4:
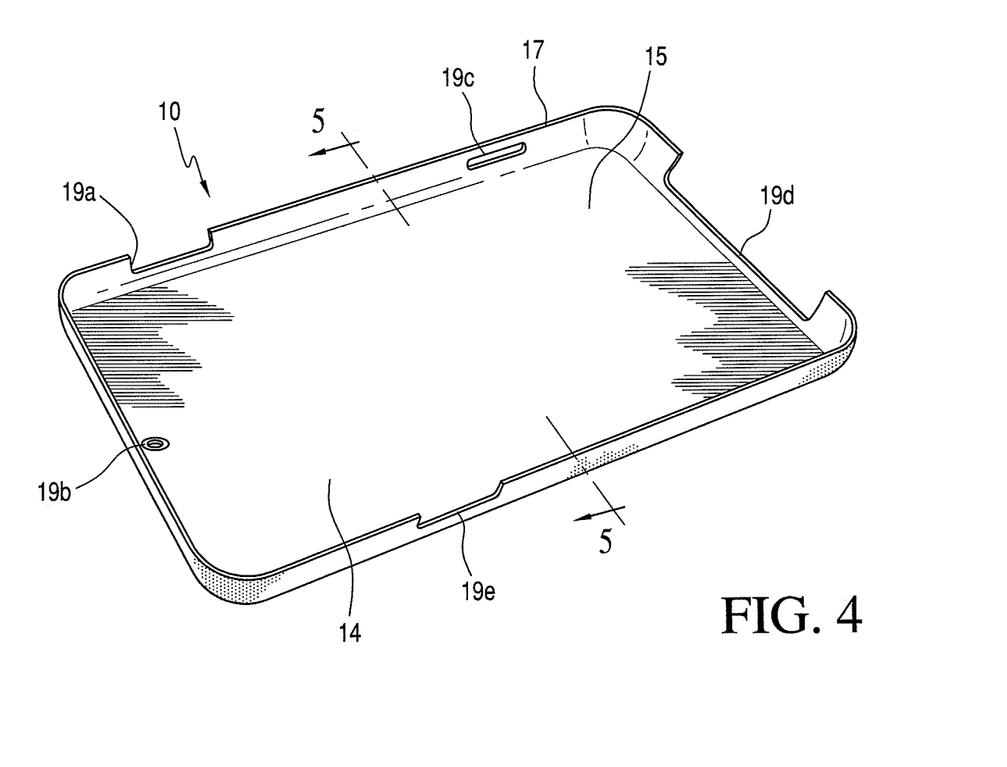
Figure 5:
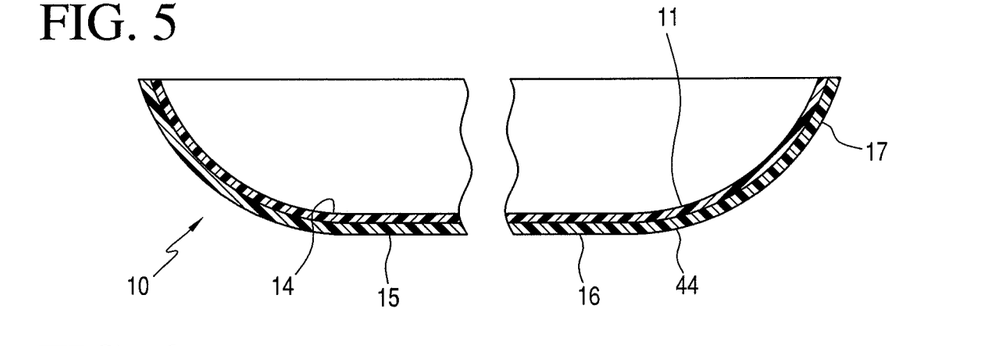
FIG. 5 is a cross sectional view of the hand pad shown in FIG. 4 along the line 5-5.
Figure 6:
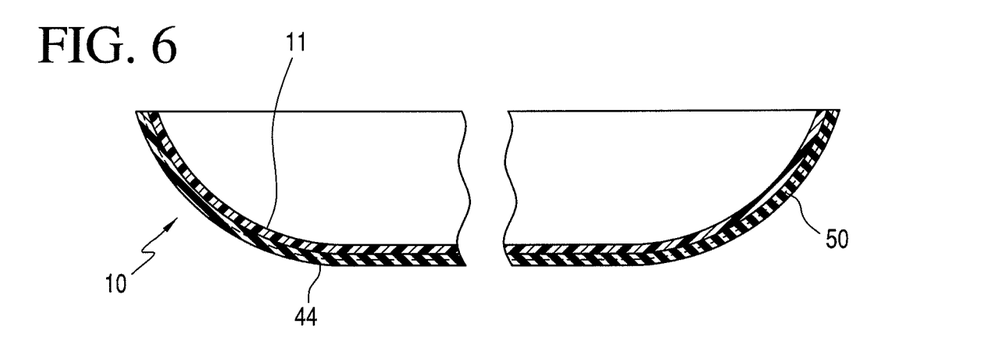
FIGS. 6, 7 and 8 are cross sectional views of hand pads in accordance with alternate embodiments of the present invention.
Figure 7:
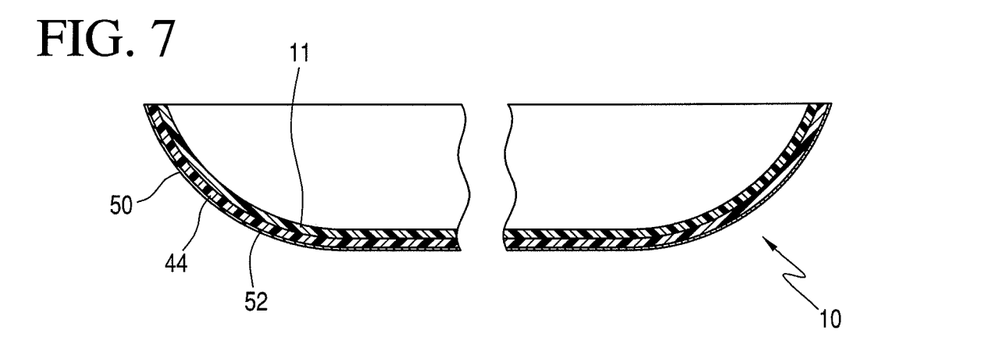

FIGS. 1 and 2 respectively show a top view and a cross sectional view of a viscoelastic solid hand pad 10 positioned about a tablet computer in accordance with the present invention. FIGS. 3, 4 and 5 respectively show a top view, a bottom view and a cross-sectional view of the same hand pad 10. The present hand pad 10 is designed for use with tablet computers 100 and other electronic devices. While the present disclosure focuses upon use of the disclosed hand pad 10 in conjunction with tablet computers 100, it is appreciate concepts underlying the present invention may be applied in the use of other electronic devices.

The hand pad 10 provides a comfortable and pleasing surface on which the user may rest his or her hands while typing upon or otherwise operating the touch screen 108 of the tablet computer 100. The materials used for the hand pad 10 provide a soft and slip-resistant surface for the user's hands. Preferably, the hardness of the materials used for the hand pad 10, as measured by a Shore A Durometer, is less than 75.

Referring again to FIGS. 1 through 5, a viscoelastic, solid hand pad 10 is shown. The hand pad 10 may take a variety of shapes depending upon the support surface provided on the tablet computer 100, or other electronic device, to which it is attached, and those skilled in the art will appreciate the many shapes which may be utilized within the spirit of the present invention.

The hand pad 10 includes a substantially planar base 15 from which side walls 17 extend. The side walls 17 are designed to assist in attaching the tablet computer 100 to the hand pad 10. The side wall 17 extends about the perimeter of the base 15 and is shaped and dimensioned to engage the edges of the tablet computer 100 for selectively securing the hand pad 10 to the tablet 100. The base 15 and the side walls 17 are formed with various cut-outs 19*a-e* shaped, dimensioned and positioned for accessing various functional components of the tablet computer 100.

The hand pad 10 also includes a bottom surface 14 and a top surface 16, which extend along the hand pad 10 so as to define the exposed surfaces of the respective base 15 and the side walls 17. The bottom surface 14 is generally flat such that the tablet computer 100 may be selectively positioned thereupon. That is, the bottom surface 14 is shaped and dimensioned for positioning of the back side 104 of the tablet computer 100 thereon with the touch screen 108 of the tablet facing upward for access by the user of the tablet computer 100. The top surface 16 is a generally flat surface shaped and dimensioned for engagement by the user of the tablet computer 100, for example, by the hands of a user supporting the tablet type computer 100 with one hand as he or she manipulates the touch screen 108 with the other hand. It is appreciated the top surface 16 may also including texture 16*a* (see FIG. 10). Because of the viscoelastic construction of the hand pad 10, the top surface 16 shifts to conform with the applied shape when the weight of the user's hands is applied thereon. The top surface 16 may also be contoured by design to comfortably match the surface of a user's hand which will hold or grab the top surface 16 while the user types or operates the touch screen 108 with his or her other hand.

In accordance with the embodiment disclosed in FIGS. 1 through 5, the viscoelastic solid hand pad 10 is preferably formed as a one-piece element including a core 11 and a coating (or skin) 44. The core 11 is composed of a viscoelastic solid-phase polymer material. The viscoelastic solid-phase polymer material is preferably a styrenic thermoplastic elastomer containing, for example, KRATON, which is manufactured by Shell Chemical Company. Other viscoelastic materials which may be used are C-FLEX (which contains silicone), TECHNOGEL or SANTOPRENE. It should be appreciated that the styrenic thermoplastic elastomer containing, for example, KRATON, may be altered via chemical and manufacturing processes. This alteration would likely include the softening of the thermoplastic elastomer. The level of tack, especially on the top surface may also be moderated through the use of talc and other products. Other treatments may be used without departing from the spirit of the present invention. Where the core 11 of the viscoelastic solid hand pad 10 is formed from a responsive, and relatively viscoelastic solid-phase polymer material, the outer surfaces of the core 11 of the viscoelastic solid hand pad 10 are formed from the same viscoelastic material as the remainder of the core 11 of the viscoelastic solid hand pad 10.

In accordance with a preferred embodiment of the present invention, the hand pad 10 is formed via an injection molding process. The core 11 of the hand pad 10 is formed to be very thin so as to not drastically change the profile of the tablet computer's housing to which they are applied. With this in mind, and in accordance with a preferred embodiment of the present invention for use with tablet computers, the thickness of the hand pad 10 should be no greater than approximately 5.00 mm and perhaps as thin as approximately 0.25 mm. However, and as those skilled in the art will appreciate, the thickness may be as much as 10 cm where the pad is utilized in different applications.

The viscoelastic hand pad 10 is further provided with a coating 44 adapted for enhanced user contact. In accordance with a preferred embodiment, the coating 44 is a fabric, for example, LYCRA, or leather or synthetic leather having phase change material incorporated therein. In addition to fabrics or leather, the coating 44 may be a foam with phase change material incorporated therein. As those skilled in the art will certainly appreciate, the phase change material may be incorporated in other polymers, especially those with viscoelastic properties. In accordance with a preferred embodiment of the present invention, OUTLAST phase change material is utilized and functions to help in regulating the temperature of the fabric or other cover material.

In accordance with a preferred embodiment of the present invention, the phase change materials are bonded, coated or otherwise attached to the fabric, leather, foam or other polymer material. For example, and with reference to FIG. 6, the phase change material 50 may be formed in a strand like structure and woven into the fabric or leather 44. In accordance with an alternate embodiment as shown with reference to FIG. 7, the phase change material might also be formed as a film 50 and applied to a back surface 52 of the fabric or leather so it is positioned between the core 11 and the coating 44. The fabric, foam or other material is then used to cover the gel or gel-like materials. The phase change materials on, and in, the fabric absorb heat from the user's hands and store the energy. This energy is later released to moderate the temperature of the unused hand pads 10. The phase change materials give the user an immediate sensation of coolness as he or she places their fingers, hands or arms on the hand pads 10. This comfortable temperature is assisted and maintained during the use of the hand pads 10. This cooler temperature pleases the user and reduces perspiration.

Figure 8:
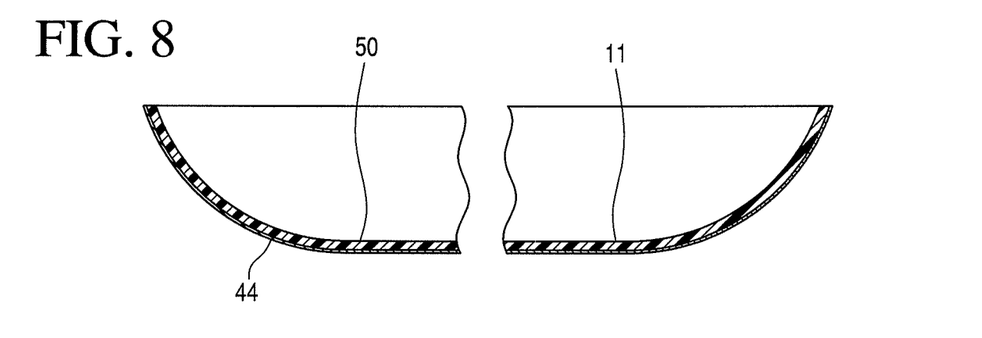
Figure 9:
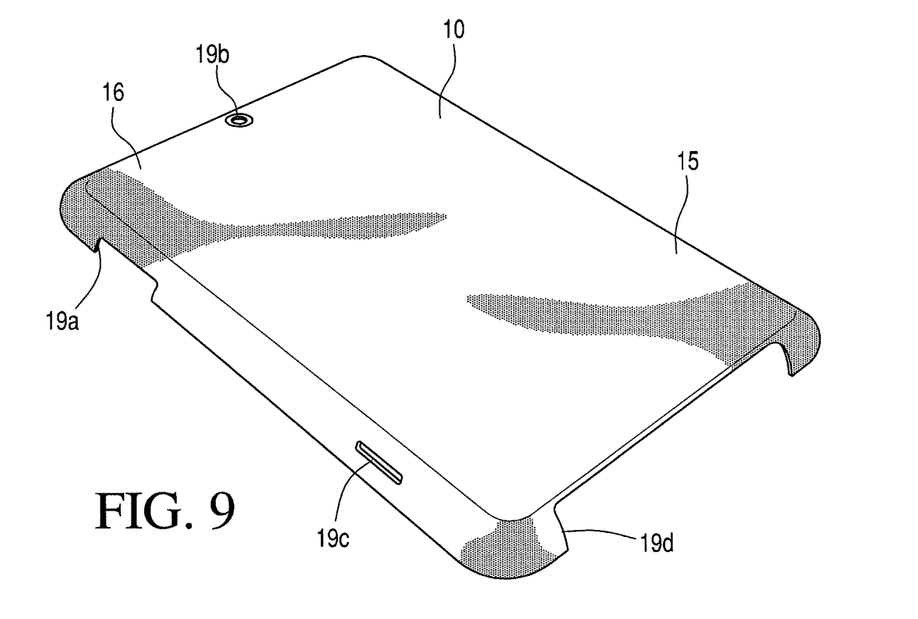
FIGS. 9 and 10 are top perspective views of hand pads in accordance with alternate embodiments of the present invention.
Figure 10:
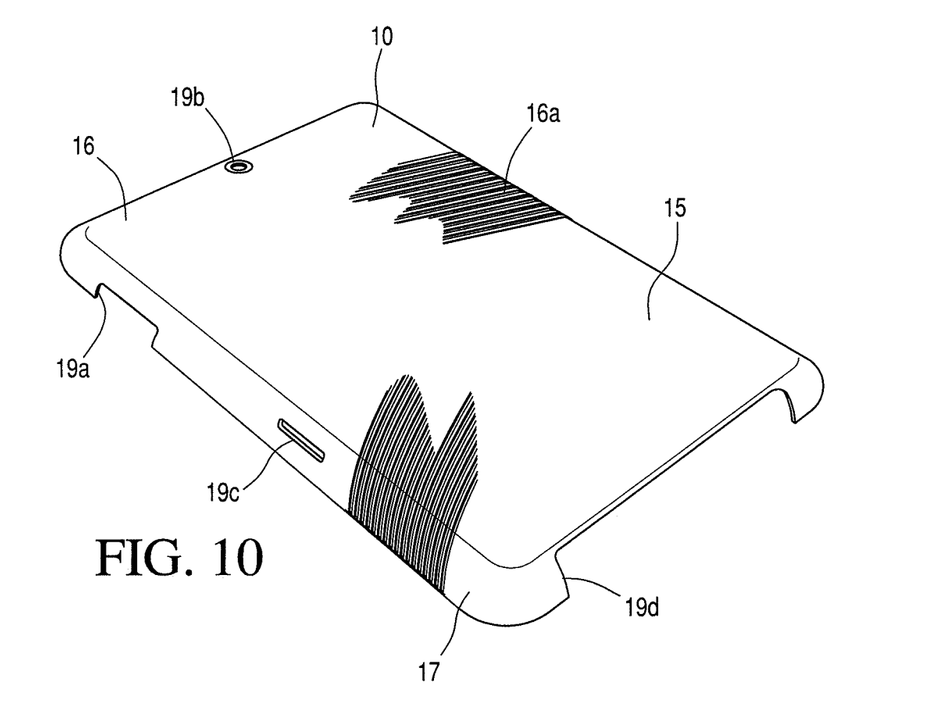
Figure 11:
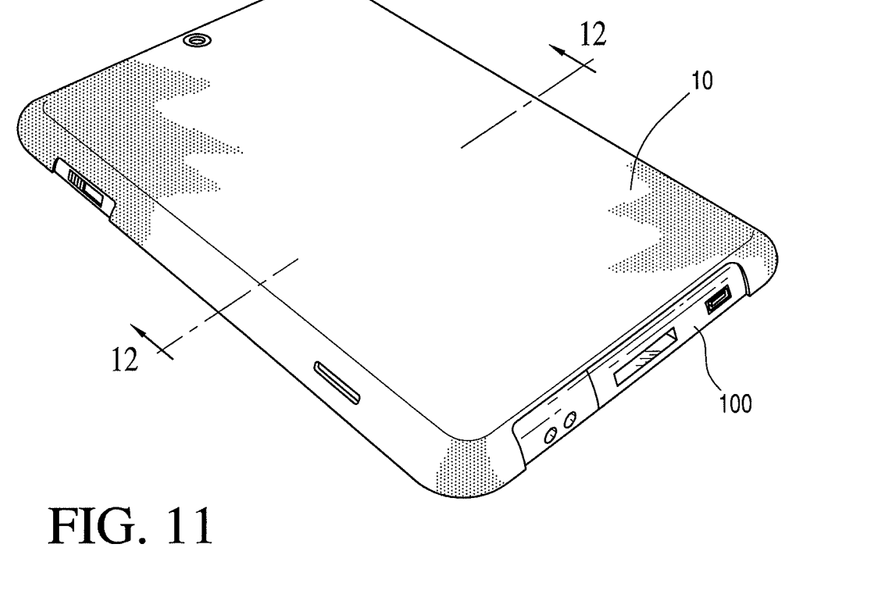
FIGS. 11 and 12 are respectively a top perspective view and a cross sectional view of a tablet computer and hand pad in accordance with an alternate embodiment of the present invention.
Figure 12:
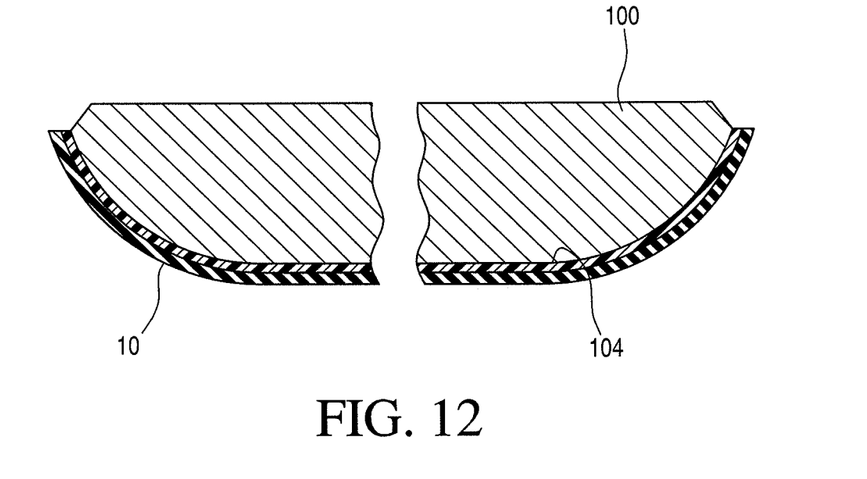
Figure 13:
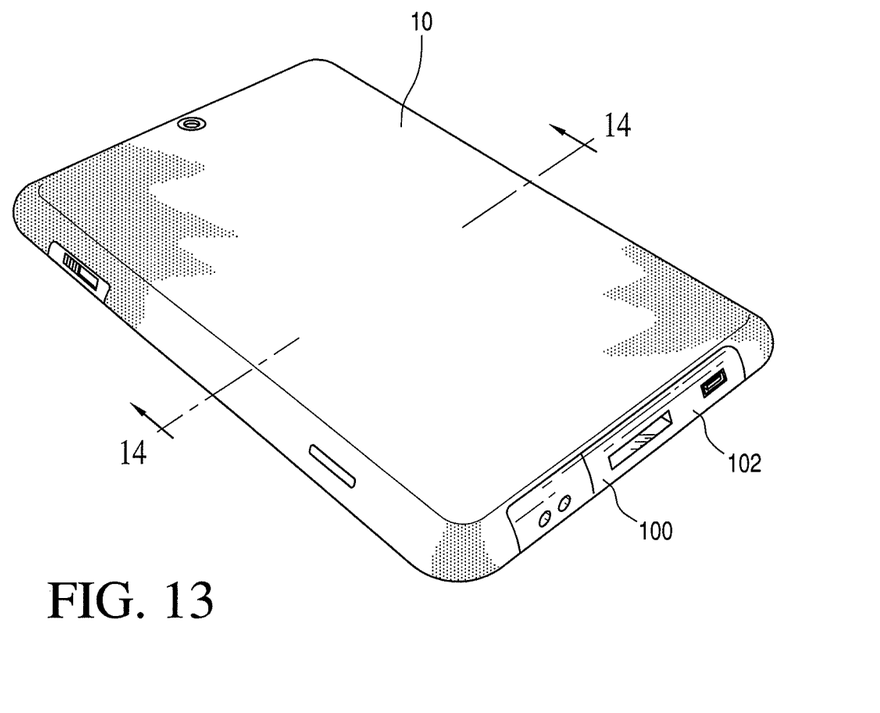
FIGS. 13 and 14 are respectively a top perspective view and a cross sectional view of a tablet computer and hand pad in accordance with an alternate embodiment of the present invention.
Figure 14:
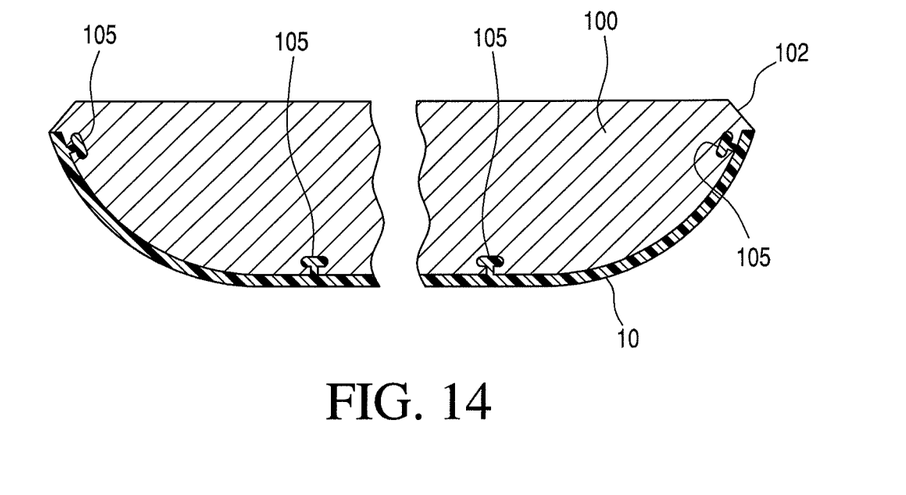

In accordance with yet a further embodiment of the present invention, and with reference to FIG. 8, the phase change materials 50 may be incorporated into the gel core 11 of the hand pads 10. Alternatively, it is contemplated the phase change material can be mixed with a base polymer or coating and applied directly to the outer surface of the hand pad core. The phase change materials may also be mixed with other plastics and then molded or extruded into the final shape of the core. In this way, the phase change materials are dispersed into the entire core of the hand pad.

It is believed that the utilization of phase change materials in conjunction with hand pads as described above may provide significant benefits to desk top/office ergonomic devices and technologies. It is contemplated that phase change materials may also be utilized in other ergonomic and soft touch products in a similar fashion to the ergonomic hand pads described herein. For example, these products and applications could include sporting good grips and equipment, household and kitchen products, automotive parts and accessories and tools and power equipment. Any product with a grip or handle provides a possible use for this technology. This is especially true for products involving a lot of human hand interaction. In addition, the use of phase change materials with ergonomic and soft touch products improves the interaction between any human/animal and various equipment/machines/electronics or accessories. These applications benefit from the moderated temperatures and reduced perspiration that phase change materials can provide. For example, a thin gel strip could be attached to a strip of phase change material coated fabric. This grip could then be gripped around a piece of sports equipment such as a tennis racquet or golf club. In addition to providing comfort, the phase change material fabric would absorb moisture while maintaining a more pleasant surface temperature for the user.

The soft hand pads 10 may be used in various locations around the tablet computer 100, or other electronic device. In particular, the soft material of the hand pad may be located where the user's fingers, hands, wrists or forearms touch the machine. The soft material of the hand pad provides additional comfort and ergonomics while providing the user with a quality, tactile feel. Some anticipated areas for the soft material of the hand pad include, but are not limited to the front, side and back edges of the tablet computer or other electronic device and the exterior cover and base of the tablet computer or other electronic device. Placement on the exterior cover and base is particularly useful in tablet computers where the user's hands and arms hold the exterior of the machine while using the touch screen and forms the principle disclosure of the hand pad 10 presented herein.

In addition to providing support for the user's hands while they hold the tablet housing 102, it is also contemplated that the hand pads 10 will provide insulation helping to maintain the tablet computer 100 at a desired temperature for the user. The viscoelastic materials used in the manufacture of the hand pad 100 as disclosed here also absorb shock and vibration from the operation of the tablet computer 100. This becomes particularly advantageous when the tablet computer is being used on an aircraft or train.

As briefly discussed above, both thermosetting materials (for example, silicone) and thermoplastic materials (for example, KRATON and SANTOPRENE) offer advantages and may be combined for producing the most useful hand pads. With regard to thermosetting materials, the thermoset gel materials, such as silicone, could be used in the following fashion. A thin layer (0.25 mm to 5.0 mm) of the gelatinous material could be cut or molded into the desired shape. It is likely that this material would be treated with additional chemicals or processes to obtain the desired form and feel. The softness of these gel materials would likely be less than Shore A 75 and most likely less than 50.

As briefly discussed above, it is contemplated the thermoplastic materials, such as KRATON and SANTOPRENE, could be injection molded into the desired shapes. These shapes could include various width, height and depth variations. For placement on tablet computer or electronic devices, the thermoplastic material would be quite thin (0.25 mm to 5.0 mm) depending on the placement. It is also possible that two different thermoplastics could be comolded or overmolded to provide a hand pad with the desired shape and function. The softness of these thermoplastics would be less than Shore A 55 and would most likely include materials of approximately 0-30 Shore A Durometer.

Figure 15:
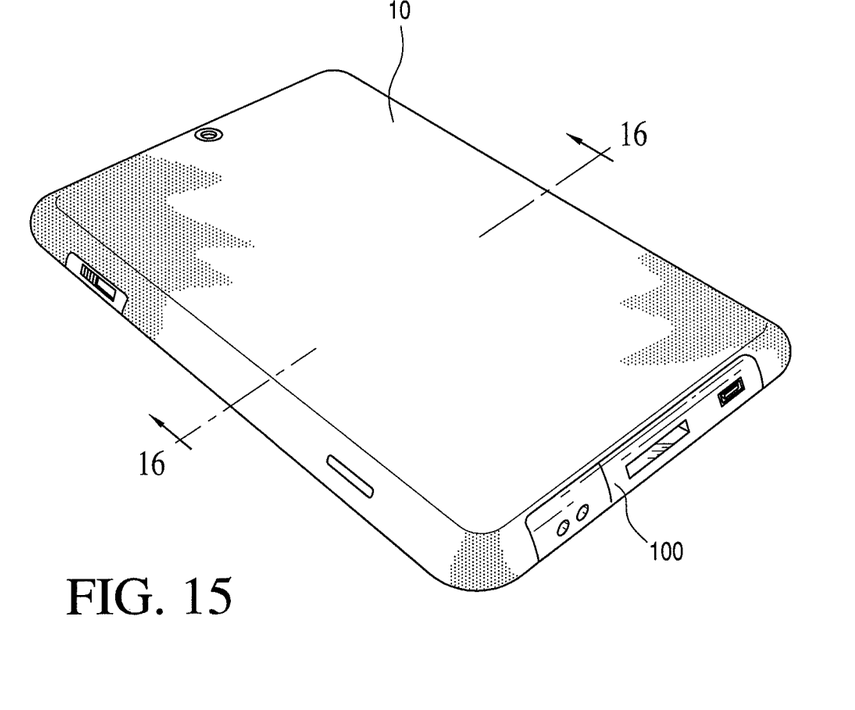
FIGS. 15 and 16 are respectively a top perspective view and a cross sectional view of a tablet computer and hand pad in accordance with another alternate embodiment of the present invention.
Figure 16:
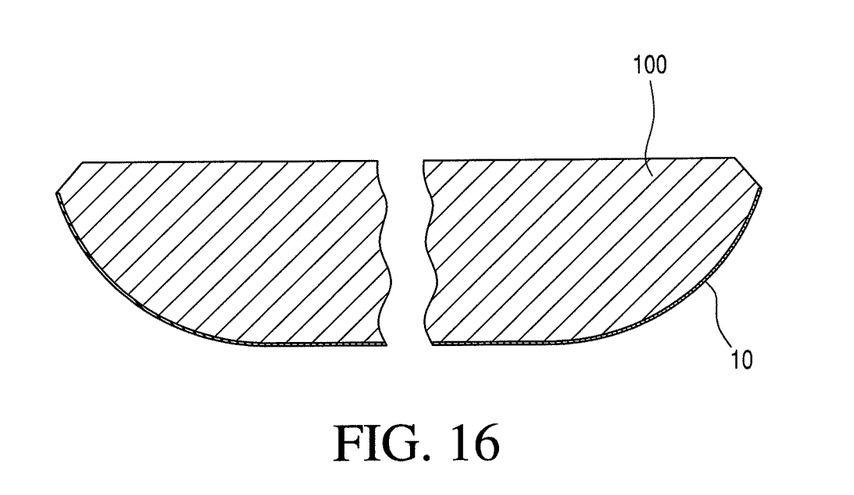

Further to the preferred embodiments disclosed above, it is contemplated soft hand pads 10 may be applied to tablet computers 100 or electronic devices in other ways. For example, it is contemplated the soft hand pads could be attached in at least four distinct ways. First, and with reference to FIGS. 11 and 12, the pad materials, that is, the hand pad 10, could be overmolded or comolded with the native plastics, glass or metals on the surfaces of the back side 104 of the housing 102 of the tablet computer 100 or other electronic device. Depending on the compatibility, this could result in a very strong bond between the soft and hard materials. The pad materials making up the hand pad 10 could also be joined to the native plastics or metals through mechanical holds or locks. For example, and with reference to FIGS. 13 and 14, the hard plastic or metal on the case or housing 102 of the tablet computer 100 or other electronic devices is formed with holes 105 formed in it. The soft elastomer material making up the hand pad 10 would flow into these holes 105 and effectively tie down the soft surface. The design and layout of these holes, channels and/or locks could be specific to the device and its dimensions. Injection molded hand pads could also be mechanically attached to the surface of the tablet computer or other electronic device through the use of channels, posts, clips, locks and/or snaps. Referring to FIGS. 15 and 16, an elastomeric paint or rubberized finish 10 could be used to cover the surfaces of the tablet computer 100 or portable electronic device and thereby function as a hand pad in accordance with the present invention. The advantages to painting include ease of use and the ability to cover complicated surfaces. This type of surface treatment would also be compatible with the existing surface of the back portion of the tablet housing.

Figure 17:
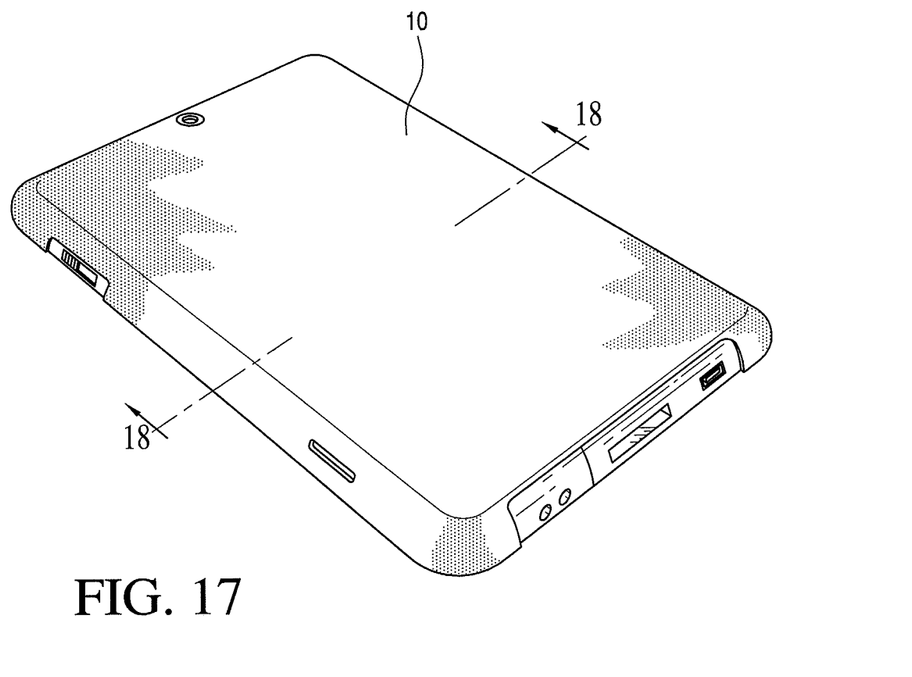
FIGS. 17 and 18 are respectively a top perspective view and a cross sectional view of a tablet computer and hand pad in accordance with a further embodiment of the present invention.
Figure 18:
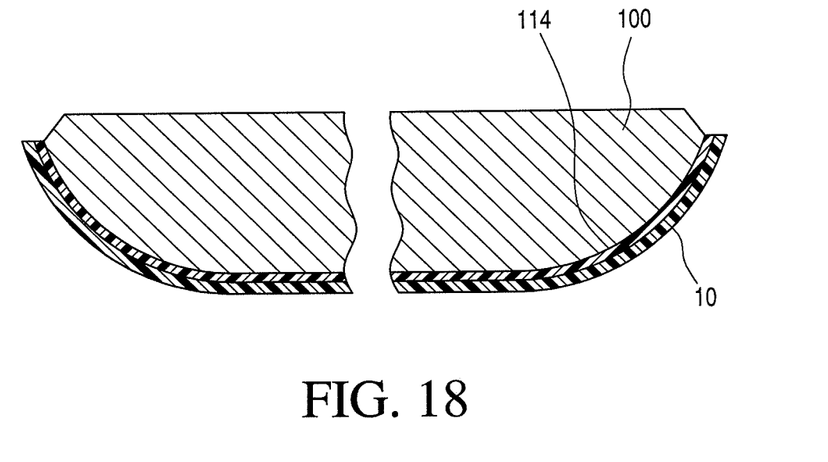

Referring to FIGS. 17 and 18, the pad material 10 could also be attached to the tablet computer 100 with adhesives 114. The first type of adhesive would be a liquid or gel glue. The glue would be applied to the hard surface of the tablet computer and/or the soft surface of the hand pads. It is anticipated that some treatment of the surfaces may be required to ensure a quality bond. The soft material would then be pressed onto the glue and hard surface. The second type would be a repositionable adhesive, possibly in the form of a double sided tape. The first side of the tape would contain a strong adhesive for permanent bonding to the soft hand pad. The second side of the tape would contain a weaker, repositionable adhesive covered by a tape liner or release sheet. In this way, the user could simply peel the tape liner off and stick the soft material pad to the surface of his or her tablet computer. The pads could be pulled on and off and repositioned a number of times.

It is anticipated that various modifications may be used regarding the soft hand pad product. Textures may be used to enhance the grip of the back cover. One anticipated texture would be a series of diagonal grooves 16a (see FIG. 10). The modifications could include use of various colors in the materials, including but not limited to: Silver Sky, Raspberry Fusion, Lavender Bliss, Blue Moon and Green Apple (see the different stippling in FIGS. 1 and 9 indicating different colors). Thermochromic agents might also be used. These agents would allow the material to change color while subjected to use and different environments.

While various preferred embodiments have been shown and described, it will be understood that there is no intent to limit the invention by such disclosure, but rather, is intended to cover all modifications and alternate constructions falling within the spirit and scope of the invention.

I claim:

1. A hand pad for use in conjunction with a tablet computer including a housing having a back side and front side with a touch screen for manipulation by a user of the tablet computer, the hand pad being shaped and dimensioned for being secured to the housing of the tablet computer for supporting a hand of a user as the user manipulates the touch screen, the hand pad comprising:
    a generally flat top surface that conforms with contact to support a hand of a user; and
    a bottom surface shaped and dimensioned to rest firmly upon the back side of the housing of the tablet computer;
    wherein the hand pad has a construction consisting of a core and a coating that defines the top surface.

2. The hand pad according to claim 1, wherein the core is a solid-phase polymer material.

3. The hand pad according to claim 2, wherein the solid-phase polymer material is a viscoelastic solid-phase material.

4. The hand pad according to claim 2, wherein the solid-phase polymer material is a thermoplastic elastomer.

5. The hand pad according to claim 2, wherein the solid-phase polymer material is a rubber or thermoset material.

6. The hand pad according to claim 2, wherein the coating is fabric, leather or foam.

7. The hand pad according to claim 1, wherein the coating is fabric, leather or foam.

* * * * *